May 8, 1951 A. J. KIRSTIN 2,552,098
PRESSURE COOKER
Filed Sept. 4, 1945 3 Sheets-Sheet 1
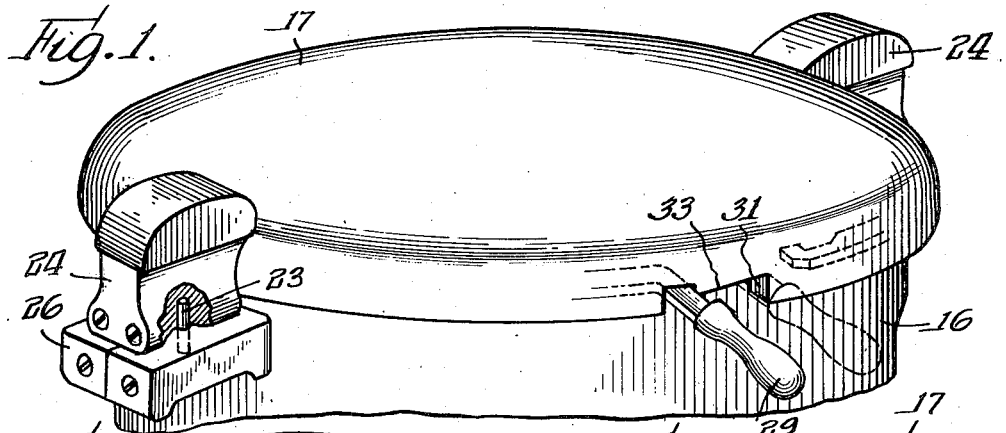
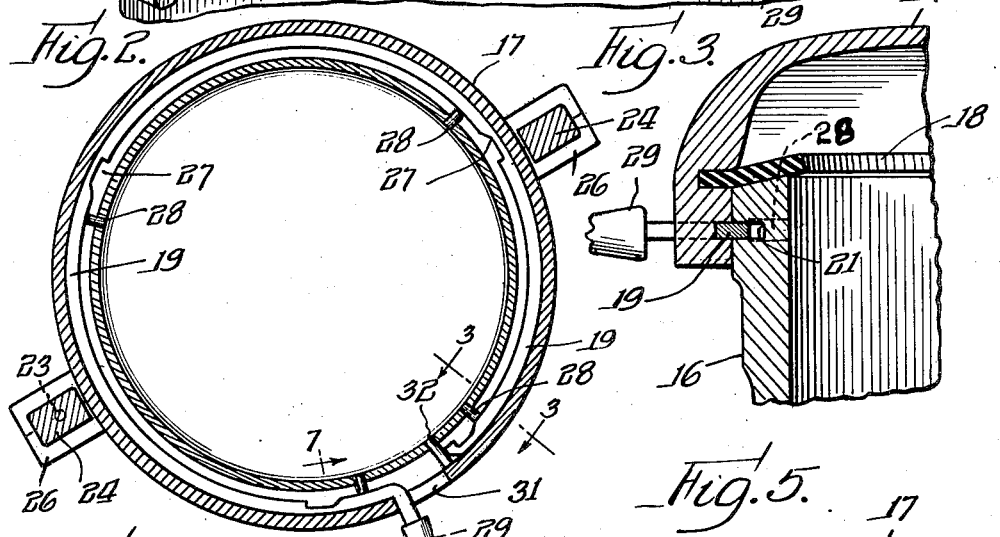
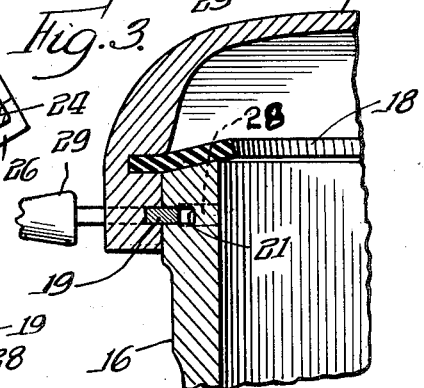
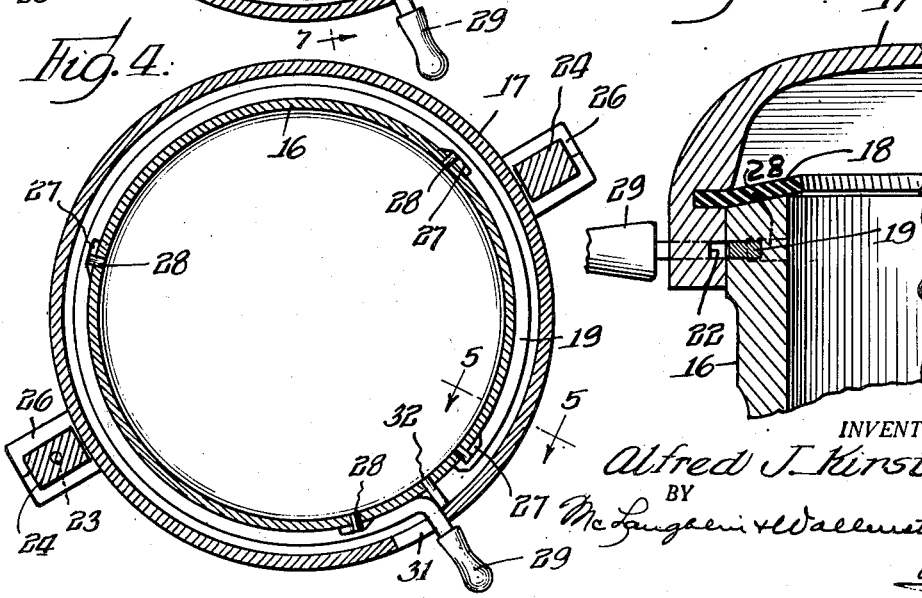
INVENTOR.
Alfred J. Kirstin
BY McLaughlin & Wallenstein
attys.

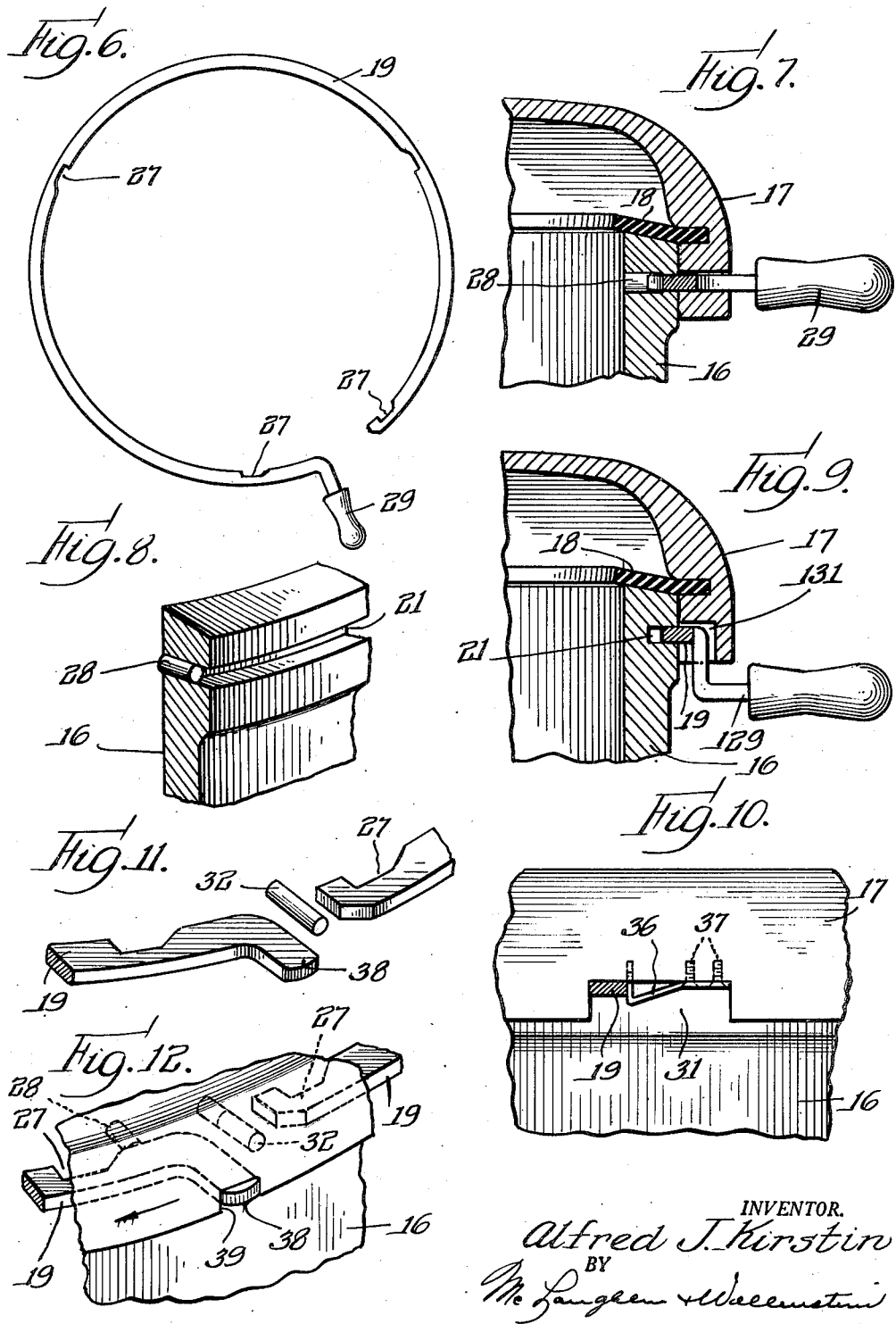

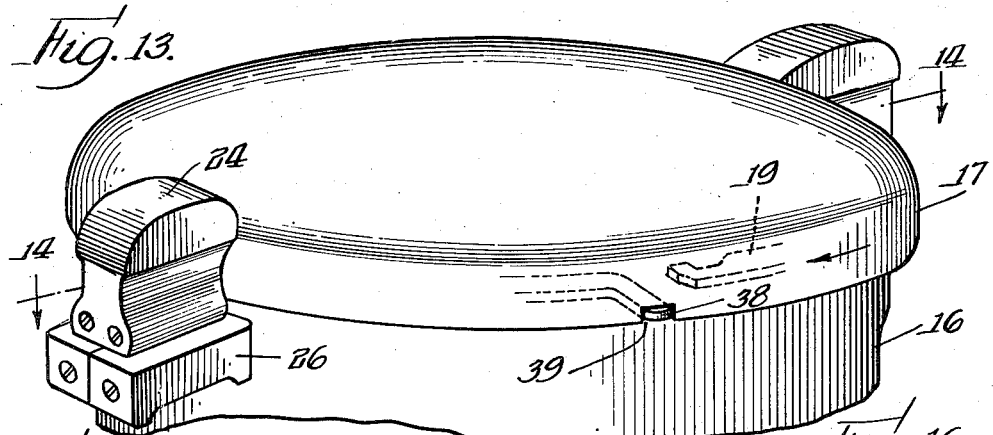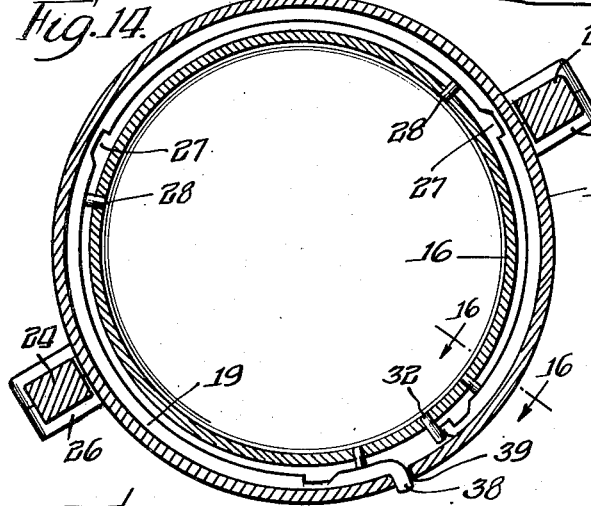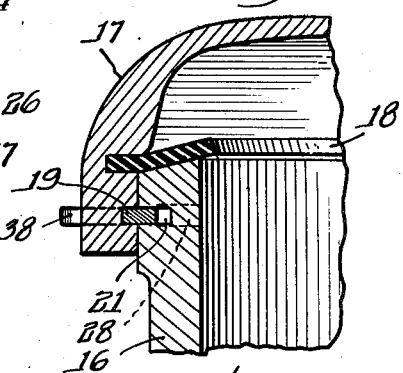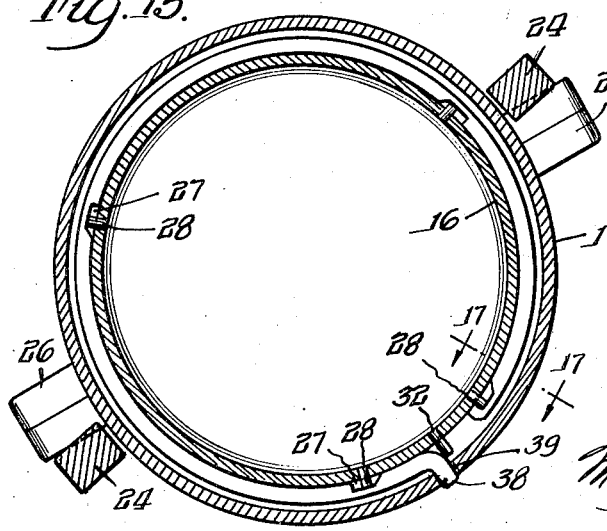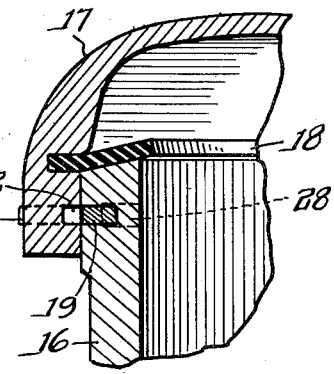

Patented May 8, 1951

2,552,098

UNITED STATES PATENT OFFICE 2,552,098

PRESSURE COOKER

Alfred J. Kirstin, Peoria, Ill., assignor to National Aluminum Manufacturing Co., Peoria, Ill., a corporation of Illinois Application September 4, 1945, Serial No. 614,147

2 Claims. (Cl. 220—61)

My invention relates to pressure cookers and, more in particular, to improved means for securing the cover to the pot of such pressure cooker.

Pressure cookers are known in which the cover and pot are locked in position by means of an expanding ring normally held in a groove on the outside of the pot but expandable partially into a groove on the cover and wherein the joint between the pot and cover is sealed by a flexible sealing ring held tightly against such joint by the vapor pressure within the pot. Such structures require rotation of the cover with respect to the pot to lock the two together and in large sizes of pressure cookers sufficient friction may develop between the sealing ring and rim of the pot (particularly if a substance having a cementitious effect should come in contact with the sealing ring) and unusual effort may be required to remove the cover at the end of a cooking operation. Another disadvantage results from the fact that unless latching means of some kind be provided, it is at times possible for the cover to become released due to pressure, in the event the user of the device has failed to turn the cover to fully locked position. This is due to the fact that when in locked position, the locking ring is under compression, one end being lodged against a stop on the pot and the other end lodged in a stop on the cover. When the cover is resting with all of its weight on the pot, there is sufficient friction to prevent any turning of the cover due to such compression of the locking ring. As vapor pressure is developed in the pot, however, there may be a brief period when the cover is "floating" and in this position it may be turned, due to spring action of the locking ring, a very slight amount. If, initially, the cover has not been rotated a sufficient distance, this slight amount of turning may be sufficient to release the cover. While this difficulty is readily overcome, and, in any event, will not occur if the instructions are followed in operation of the device, I have found a simple means of so improving the locking mechanism as to avoid the described difficulty. I have found that my improved locking arrangement may be employed in such a manner as to utilize turning movement of the cover for operation thereof or in such a manner that the locking ring may be turned independently of the cover in accordance with the preferred arrangement described hereinbelow.

In carrying out my invention, I provide, in the groove carrying the locking ring, a plurality of projections, conveniently pins, which extend into recesses or notches on the inner edge of the locking ring. These notches are finished with a slanting shoulder on one side which acts as a cam to permit the entire locking ring riding up on the projections when the locking ring is moved to expanded position, thereby positively holding the entire locking ring in expanded position. This cam arrangement may be provided in several ways, but the provision of notches on the locking ring and projections in the nature of pins in the groove represent the simplest and most economical manner of carrying out the idea which I have been able to devise. This arrangement of locking ring may be employed by anchoring one end of the locking ring against a stop on the pot and providing an extending handle on the other end for expansion of the ring independently of the cover; or one end of the locking ring may be engaged by the cover and operated by partial rotation of the cover, if desired.

The objects and additional features of the invention will be further brought out in the following detailed description taken with the accompanying drawings wherein:

Fig. 1 is a fragmentary perspective view showing my invention applied to a pressure cooker of a type wherein the locking ring is operated without rotation of the cover;

Fig. 2 is a transverse sectional view taken through the cover and upper portion of the pot and showing the locking ring in elevation;

Fig. 3 is a fragmentary sectional view taken on the line 3—3 of Fig. 2, showing the locking ring in locked position;

Fig. 4 is a sectional view similar to Fig. 2, but showing the locking ring in unlocked position;

Fig. 5 is a sectional view taken on the line 5—5 of Fig. 4;

Fig. 6 is a plan view of the locking ring removed from the pot;

Fig. 7 is a fragmentary sectional view partly in elevation taken along the line 7—7 of Fig. 2 looking in the direction of the arrows;

Fig. 8 is a fragmentary perspective view partly in elevation, showing the manner in which the locking pins may be mounted in the groove on the top of the pot;

Fig. 9 is a view similar to Fig. 7 but showing a modification of the cover and locking ring;

Fig. 10 is a fragmentary side elevational view with a portion of the locking ring shown in section and illustrating a modified arrangement for positively securing the locking ring in locked position;

Fig. 11 is a perspective view of two ends of a modified type of locking ring wherein the cover is rotated with respect to the pot to operate the locking ring;

Fig. 12 is a fragmentary perspective view of the upper portion of such pot;

Fig. 13 is a fragmentary, perspective view of a pot and cover in which the locking ring is moved to locking position by rotation of the cover with respect to the pot;

Fig. 14 is a plan sectional view taken on the line 14—14 of Fig. 13 looking in the direction of the arrows and showing the locking ring in locked position;

Fig. 15 is a similar view, but showing the cover rotated slightly in a counterclockwise direction and with the locking ring in unlocked position;

Fig. 16 is a sectional view taken on the line 16—16 of Fig. 14; and

Fig. 17 is a sectional view taken on the line 17—17 of Fig. 15.

While my invention shows several minor modifications, it is illustrated in two main forms, namely, one in which the locking ring may be moved to or from locking position entirely independently of relative movement of the pot and cover and one in which the means for operating the locking ring to move it to locking or unlocked position is associated with and generally incident to relative rotation between the pot and cover. For convenience in illustrating the invention, the first described embodiment utilizes the principle of operating the locking ring independently of movement of the cover with respect to the pot but it is to be understood that both major forms of the invention have certain advantages and one is not necessarily preferred over the other so far as the present application is concerned.

Referring now first to Figs. 1–8, inclusive, the pressure cooker of my invention comprises a pot 16 and cover 17 with a sealing ring 18 for sealing the joint between the pot and cover and a locking ring 19, normally disposed in an annular groove 21 in the pot but capable of expansion into locking position within a groove 22 on the cover. Since this particular embodiment of the invention does not require rotation of the cover with respect to the pot, I find it advisable to provide means for preventing the cover from rotating with respect to the pot. Simple means comprise a pin 23 carried by one of the handles 24 of the cover and adapted to project into an opening provided in the handle 26 on the pot.

The locking ring 19 is provided with a number of internal edge recesses 27. One side of each recess 27 is generally radial while the other side is slanted to provide a cam surface capable of riding up onto pins 28 which, in the unlocked position of the locking ring, engage in the recess 27, but, in the locked position of the locking ring, engage against the inner peripheral surface of the locking ring. One end of the locking ring is turned radially to provide a handle 29, this radial portion of the locking ring projecting through an edge recess 31 on the cover. The opposite end of the locking ring is adapted to engage a stop pin 32 which completely fills the groove 21. The edge recess 31 is wide enough to permit the necessary movement of the handle 29 to move the locking ring from unlocked to locked position, that is to say, from the position shown in Fig. 4 to the position shown in Fig. 2, and, of course, in the opposite direction for again unlocking the cover from the pot. During the locking movement, the locking ring shifts bodily in a clockwise direction and, in so doing, rides up on top of the pins 28. This rotary shifting movement is, however, limited by the stop 32 so that in addition to movement of the ring as a whole, there is also an expansion and separating of the ends to assure that all sections of the ring are expanded and all of the pins 28 are withdrawn from their corresponding recesses 27. While the locking ring will normally be held in expanded or locked position without special precaution, I utilize a sloping shoulder 33 behind which the radial portion of the locking ring is adapted to engage when in locking position, the action being for the slanting portion of the shoulder to deflect the radial portion of the locking ring slightly downwardly with the result that it will then spring up behind the square portion of the shoulder and lock the ring in position. It is shown in this position in full lines in Fig. 1. To return it to the dotted line position of Fig. 1 (the position of Fig. 4) it is simply necessary to deflect the radial portion of the locking ring slightly downwardly and then force the entire ring in a counterclockwise direction to again engage the pins 28 in the recesses 27 and unlock the cover from the pot.

In using the pressure cooker of my invention, the contents are placed in the pot with the requisite amount of water, the cover placed in position over the rim of the pot and down over the locking ring which, at this time, is substantially entirely contained within the groove 21 and the locking ring then moved by means of the handle 29 in a clockwise direction to expand the locking ring and positively lock the cover in place. Heat is applied in the customary way and vapor generated within the pressure cooker forces the sealing ring 18 down tightly against the rim of the pot to cause a firm seal between the pot and cover. The pressure cooker is operated in the usual way with suitable pressure controlling, indicating and relief devices and when cooking has continued for an adequate length of time and pressure within the pot reduced to a safe value, the locking ring is returned to unlocked position and the cover lifted directly from the pot without need of rotating the same.

In Fig. 9, I indicate a modification wherein the recess 131, into which the handle projects, extends only part way through the thickness of the cover and the radial portion of the handle 129 is downwardly offset in the manner indicated in the drawing. In all other respects, the design may be identical with that shown in the preceding figures and the same numerals are used to identify identical parts. Fig. 9 illustrates the manner in which the periphery of the cover may be left unbroken, for example, for decorative purposes or the like, and the pressure cooker in all other respects may be the same as in the first described embodiment.

In the embodiment of the invention shown in Fig. 10, I utilize a pot 16 and cover 17 with the same sealing and locking ring relationship as described in connection with the main embodiment. I provide in the recess 31, however, a latch 36 in the form of a spring secured in position by means of screws 37. The radial portion of the ring 19 is so related to the latch 36 that it may spring the same upwardly when moved to locked position and the latch will then spring downwardly behind the radial portion of the locking ring and hold it in locked position. In order to return the locking ring to unlocked position it is simply necessary to force the latch 36 upwardly using any suitable device for the purpose.

In the form of invention shown in Figs. 11 to 17, inclusive, the locking ring 19 has a radial portion 38 which engages into an edge recess 39 on the cover. In all other respects, the construction may be identical with that shown in the preceding embodiments and for convenience the same reference characters are applied to equivalent or identical parts. There are the same stop pin 32, pins 28, locking ring recesses 27 and sealing ring 18. In this form of the invention there must be a relative rotating movement between the pot and cover so that nothing equivalent to the positioning pin 23 (see Fig. 1) would be employed. When the cover is rotated in the direction indicated by the arrow in Figs. 12 and 13, the ring is caused to move bodily with respect to the pot until its end strikes the stop 32. There is then a positive expansion of the locking ring due to movement apart of its two ends in addition to the expansion caused by the locking ring engaging over the top of the projections comprising pins 28. Movement of the cover in a direction opposite to that shown by the arrow in Figs. 12 and 13 has the effect of unlocking the cover from the pot, but the functioning of the locking ring is the same as described in connection with the first embodiment.

This action of the locking ring, in response to movement of the cover, is best understood by reference to Figs. 14–17, inclusive. In Figs. 14 and 16, the cover has been rotated with respect to the pot in the direction indicated by the arrow in Fig. 13 so that the handles of the pot and cover are directly above each other and the locking ring assumes the position shown in these two figures. In Figs. 15 and 17, the parts are in the position in which the cover has been rotated in a counter-clockwise direction to return the locking ring to unlocked position. In Fig. 16, the locking ring is shown in a position between the two grooves in the pot and cover with the radial end portion 38 of the locking ring projecting slightly outwardly beyond the edge of the cover; while in Fig. 17 the ring is shown in only the groove 21 on the pot and the position of the radial portion 38 shows that the entire ring has contracted in the manner previously explained.

I have shown and described the several embodiments of my invention in order that those skilled in the art may understand how to practice the same but the invention is limited only by the scope of the claims.

What I claim as new and desire to protect by Letters Patent of the United States is:

1. In a pressure cooker, a pot and cover having a joint between them and oppositely positioned contiguous annular grooves, a locking ring normally contained in said grooves on the pot and having a plurality of recesses on its inner surface, a plurality of projections from the pot extending into said recesses, means including said cover for shifting the ring bodily to cause the said projections to ride outside the recesses and expand the ring, and a flexible sealing ring supported to engage said joint between the pot and cover.

2. In a pressure cooker, a pot and cover having a joint between them and oppositely positioned contiguous annular grooves, a locking ring normally contained in said grooves on the pot and having a plurality of recesses on its inner surface, a plurality of projections from the pot extending into said recesses, means responsive to relative rotation of the pot and cover for shifting the ring bodily to cause the said projections to ride outside the recesses and expand the ring, and a flexible sealing ring supported to engage said joint between the pot and cover.

ALFRED J. KIRSTIN.

REFERENCES CITED

The following references are of record in the file of this patent:

UNITED STATES PATENTS

| Number | Name | Date |
|---|---|---|
| 1,137,085 | Riddle | Apr. 27, 1915 |
| 2,414,529 | Ives | Jan. 21, 1947 |

FOREIGN PATENTS

| Number | Country | Date |
|---|---|---|
| 263,723 | Great Britain | Jan. 6, 1927 |